US007322393B2

United States Patent
Serra et al.

(10) Patent No.: US 7,322,393 B2
(45) Date of Patent: Jan. 29, 2008

(54) SEALING MATERIAL, TIRE FOR A VEHICLE WHEEL INCLUDING THE SEALING MATERIAL, AND PROCESS FOR PRODUCING THE TIRE

(75) Inventors: Antonio Serra, Genoa (IT); Pierangelo Misani, Monza (IT); Jean-Louis Locatelli, Seyssuel (FR)

(73) Assignee: Pirelli Pneumatici S.p.A., Milan (IT)

( * ) Notice: Subject to any disclaimer, the term of this patent is extended or adjusted under 35 U.S.C. 154(b) by 353 days.

(21) Appl. No.: 10/490,872

(22) PCT Filed: Sep. 20, 2002

(86) PCT No.: PCT/EP02/10580

§ 371 (c)(1),
(2), (4) Date: Oct. 12, 2004

(87) PCT Pub. No.: WO03/028986

PCT Pub. Date: Apr. 10, 2003

(65) Prior Publication Data

US 2005/0034799 A1   Feb. 17, 2005

(30) Foreign Application Priority Data

Sep. 27, 2001   (EP) ................... 01123098

(51) Int. Cl.
 *B60C 19/12*   (2006.01)
 *B29C 73/16*   (2006.01)
(52) U.S. Cl. ............... 152/503; 152/504; 156/115; 156/123; 523/166

(58) Field of Classification Search ............... 156/115, 156/123; 152/502–507, 510; 523/166
See application file for complete search history.

(56) References Cited

U.S. PATENT DOCUMENTS

| 3,981,342 | A | 9/1976 | Farber et al. |
| 4,140,167 | A | 2/1979 | Böhm et al. |
| 4,171,237 | A | 10/1979 | Böhm et al. |
| 4,228,839 | A | 10/1980 | Böhm et al. |
| 4,768,937 | A | 9/1988 | Singh |
| 4,872,822 | A | 10/1989 | Pizzorno |
| 4,895,610 | A | 1/1990 | Egan |
| 2003/0230376 | A1 * | 12/2003 | Smith et al. ............... 156/115 |

FOREIGN PATENT DOCUMENTS

| EP | 0 127 998 A2 | 12/1984 |
| EP | 0 199 064 A2 | 10/1986 |

(Continued)

*Primary Examiner*—Geoffrey L. Knable
(74) *Attorney, Agent, or Firm*—Finnegan, Henderson, Farabow, Garrett & Dunner, L.L.P.

(57) ABSTRACT

A sealing material includes the following characteristics: a value of a dynamic elastic modulus, measured at a temperature of 80° C., at a frequency of 1 Hz, and with a deformation of 5%, that is at least 60% lower than a value of the dynamic elastic modulus measured at the temperature of 80° C., at the frequency of 1 Hz, and with a deformation of 1%; and the value of the dynamic elastic modulus, measured at the temperature of 80° C., at the frequency of 1 Hz, and with the deformation of 5%, that is greater than or equal to 0.05 kPa. A tire for a vehicle wheel includes a carcass structure comprising at least one carcass ply and at least one layer of sealing material disposed in a radially inner position with respect to the at least one carcass ply. A process for producing the tire is also disclosed.

31 Claims, 2 Drawing Sheets

FOREIGN PATENT DOCUMENTS

| | | |
|---|---|---|
| EP | 0 242 840 B1 | 10/1987 |
| EP | 0 919 406 B1 | 6/1999 |
| EP | 0 928 680 B1 | 7/1999 |
| EP | 0 928 702 B1 | 7/1999 |
| EP | 0 943 421 B1 | 9/1999 |
| WO | WO 01/36185 A1 | 5/2001 |

* cited by examiner

SEALING MATERIAL, TIRE FOR A VEHICLE WHEEL INCLUDING THE SEALING MATERIAL, AND PROCESS FOR PRODUCING THE TIRE

CROSS-REFERENCE TO RELATED APPLICATIONS

This application is a national-phase entry under 35 U.S.C. § 371 from International Application No. PCT/EP02/10580, filed Sep. 20, 2002, in the European Patent Office, the contents of which are relied upon and incorporated herein by reference; additionally, Applicant claims the right of priority under 35 U.S.C. § 119(a)-(d) based on patent application No. 01123098.4, filed Sep. 27, 2001, in the European Patent Office.

BACKGROUND OF THE INVENTION

1. Field of the Invention

The present invention relates to a self-sealing tyre for vehicle wheels.

More particularly, the present invention relates to a self-sealing tubeless tyre for vehicle wheels, to a process for manufacturing said tyre, and to a sealing material used therein.

2. Description of the Related Art

In the industrial field of tyres for vehicle wheels, various attempts have been made to produce self-sealing tyres, in other words tyres which can retard or prevent the loss of air and their consequent deflation following a puncture caused by a sharp object (a nail, for example).

In the known art, descriptions have been given of self-sealing tyres provided with at least one layer comprising a polymeric material which can adhere to the object causing the puncture and can also flow into the puncture site when said object is removed, thus sealing the puncture and preventing the outflow of air from the tyre.

For example, U.S. Pat. No. 3,981,342 describes a self-sealing tubeless tyre provided with a layer including a composition comprising a mixture of a low molecular weight liquid elastomer and a high molecular weight solid elastomer, and a quantity of a cross-linking agent sufficient to give a partial cross-linking of said mixture, said liquid elastomer being present in a greater quantity than said solid elastomer. Examples of low molecular weight liquid elastomers which can be used according to the invention are: liquid cis-polyisoprene (for example, heat-depolymerized natural rubber, or low molecular weight depolymerized cis-polyisoprene); liquid polybutadiene; liquid polybutene; liquid EPDM; liquid butyl rubber. Examples of high molecular weight elastomers which can be used according to the invention are highly unsaturated rubbers such as, for example, isoprene homopolymers (particularly natural or synthetic cis-polyisoprene); polybutadiene (particularly with a high cis content); polychloroprene; copolymers containing a major proportion of conjugated dienes (butadiene, for example) and a minor proportion of copolymerizable monomers containing monoethylenically unsaturated monomers (styrene or acrylonitrile, for example). Alternatively, it is possible to use elastomers with a low degree of unsaturation such as butyl rubbers (isoolefin copolymers, for example isobutylene, with small quantities of dienes, for example isoprene), or EPDM-type rubbers (copolymers of at least two different monoolefins such as ethylene and propylene with a small quantity of a non-conjugated diene such as dicyclopentadiene, 1,4-hexadiene, 5-ethylidene-2-norbornene). Finally, it is also possible to use saturated elastomers such as EPM or ethylene-vinyl acetate copolymers. Examples of cross-linking agents which can be used according to the invention are: sulphur or sulphur donors; quinones; organic peroxides; polyisocyanates; and tetrahydrocarbyl titanate esters. Said layer would be able to impart self-sealing properties to the tyre.

U.S. Pat. No. 4,140,167 describes a sealing material usable, in particular, in the field of tyres. In the tyre, said sealing material can consist of a single layer, or a composite laminar structure. Preferably, said composite laminar structure comprises at least five layers of elastomeric material of which: two outer layers comprising an elastomeric material and an agent for retarding cross-linking by radiation, two inner layers comprising an elastomeric material and an agent for promoting cross-linking by radiation, and one layer, located between said two inner layers, comprising said sealing material which is at least partially degradable by radiation, or by heat in the presence of a peroxide. Examples of materials which are degraded by radiation, or by heat in the presence of a peroxide, useful according to the invention are polyisobutylene and its copolymers, or polyethylene oxide. Said sealing material would be able to impart self-sealing properties to the tyre.

U.S. Pat. No. 4,228,839 describes a self-sealing tyre provided with a layer comprising a mixture of a radiation-degradable polymeric material and a polymeric material which can be cross-linked by radiation and/or by heat. The degradable polymeric material can be selected from: polyisobutylene; copolymers of isobutylene with: conjugated olefins such as 1,3-butadiene, isoprene, 2,3-methylbutadiene, or with vinyl aromatic monomers such as styrene and alpha-methyl styrene, or with vinyl polar monomers such as acrylonitrile, methylvinyl acrylate, methylvinyl lactone. The cross-linkable polymeric material can be selected from natural rubber; styrene/butadiene copolymers; polybutadiene; polyisoprene; block copolymers, for example styrene/butadiene/styrene; halogenated butyl rubbers, for example chlorobutyl rubber; ethylene-propylene terpolymers; butadiene-acrylonitrile copolymers; neoprene. Said layer would be able to impart self-sealing properties to the tyre.

Patent application EP 127 998 describes a tubeless tyre in which the inner liner is a laminar structure formed by two outer layers comprising a halogenated butyl rubber and an inner layer comprising a butyl rubber and a peroxide. After vulcanization, the butyl rubber of said inner layer would be degraded, because of the presence of the peroxide, thus producing a polymeric material having a Mooney viscosity (ML 1+4) in the range from 2 to 12. Said polymeric material would be able to impart self-sealing properties to the tyre.

U.S. Pat. No. 4,895,610 describes a self-sealing tyre provided with a layer comprising a butyl rubber and a peroxide. Preferably, said layer comprises: 100 parts of butyl rubber; about 10 to 40 parts of carbon black; about 5 to 35 parts of polyisobutylene; about 5 to 35 parts of an oil; about 0 to 1 parts of sulphur; and about 1 to 8 parts of a peroxide. During the vulcanization of the tyre, the butyl rubber, in the presence of the peroxide, would be capable of being partially cross-linked, thus providing dimensional stability to said layer, and also of being partially degraded, thus providing a low-viscosity tacky material capable of imparting self-sealing properties to said tyre.

SUMMARY OF THE INVENTION

In the Applicant's opinion, one of the major problems encountered in self-sealing tyres is that of finding a correct combination of properties for the sealing material used. Infact, said material must be able to flow rapidly towards the puncture, to adhere to the object causing the puncture, and to not flow out of the puncture, in order to prevent the loss of air and the consequent deflation of the tyre. Furthermore, the sealing material must maintain its position inside the tyre when the vehicle is halted or during storage. On the other hand, when the tyre is made to move, which could potentially create non-uniformities in the distribution of the sealing material, said sealing material must be capable of being rearranged rapidly and uniformly inside the tyre. Infact, a displacement of the sealing material from its original position and its accumulation in other areas of the tyre would not only cause a loss of balance in the weight distribution within the tyre, but would also make its use as a sealing layer ineffective, or would at least impart an unsatisfactory self-sealing capacity to the tyre. The sealing material must also be capable of being applied during the building of the tyre, thus avoiding the need to subject the finished tyre to further post-production treatments.

The Applicant has now found that it is possible to obtain the desired combination of properties by using a sealing material whose dynamic elastic modulus (G') measured at high deformations (5%) is significantly lower than the value of said modulus measured at low deformations (1%).

In a first aspect, therefore, the present invention relates to a tyre for vehicle wheels, comprising:
a carcass structure having at least one carcass ply shaped in a substantially toroidal configuration, whose opposite lateral edges are associated with respective right- and left-hand bead wires, each bead wire being incorporated in a respective bead;
a belt structure comprising at least one belt strip applied in a circumferentially outer position with respect to said carcass structure;
a tread circumferentially superimposed on said belt structure;
a pair of sidewalls applied laterally on opposite sides with respect to said carcass structure;
at least one layer of sealing material placed in a radially inner position with respect to said carcass ply;

in which said sealing material has the following characteristics:
(a) a value of the dynamic elastic modulus (G'), measured at a temperature of 80° C., at a frequency of 1 Hz, with a deformation of 5%, which is at least 60% lower than the value of said modulus measured at a temperature of 80° C., at a frequency of 1 Hz, with a deformation of 1%;
(b) a value of the dynamic elastic modulus (G'), measured at a temperature of 80° C., at a frequency of 1 Hz, with a deformation of 5%, which is not less than 0.05 KPa, preferably in the range from 0.1 KPa to 0.4 KPa.

In a preferred embodiment, said layer of sealing material is placed between said carcass ply and a layer of elastomeric material placed in a radially inner position with respect to said carcass ply.

In a further preferred embodiment, a further layer of elastomeric material is placed between said layer of sealing material and said carcass ply.

In a further preferred embodiment, said layer of sealing material extends over a surface substantially corresponding to the surface of development of said tread.

In a further preferred embodiment, a strip of elastomeric material, preferably having a substantially triangular cross section, is placed along each outer edge of said layer of sealing material.

In a further preferred embodiment, said layer of sealing material has a thickness in the range from 1.5 mm to 4.5 mm, preferably in the range from 2 mm to 4 mm.

In a further preferred embodiment, said sealing material is obtained by thermal degradation of a composition comprising at least one thermally degradable polymer. More preferably, said composition comprises:
100 phr of at least one thermally degradable polymer;
from 50 phr to 150 phr, preferably from 55 phr to 120 phr, of at least one reinforcing filler;
from 30 phr to 100 phr, preferably from 35 phr to 70 phr, of at least one plasticizer; and
a quantity of not less than 10 phr, preferably in the range from 10 phr to 15 phr, of at least one organic peroxide.

In the present description and in the claims, the expression "phr" is intended to indicate the parts by weight of a given component per 100 parts by weight of polymer.

In a further aspect, the present invention relates to a process for producing tyres for vehicle wheels, said process comprising the following steps:
making at least one coating layer of cross-linkable elastomeric material on an outer surface of a toroidal support the shape of which substantially matches that of the inner surface of the tyre;
making at least one layer consisting of a composition comprising at least one thermally degradable polymer in a circumferentially outer position with respect to said coating layer of cross-linkable elastomeric material;
applying at least one carcass ply in a circumferentially outer position with respect to said layer consisting of a composition comprising at least one thermally degradable polymer;
applying a belt structure in a circumferentially outer position with respect to said carcass structure;
applying a tread in a circumferentially outer position with respect to said belt structure;
applying at least one pair of sidewalls on said carcass structure in laterally opposing positions;
subjecting the green tyre to moulding in a mould cavity formed in a vulcanization mould;
subjecting said green tyre to cross-linking by heating to a predetermined temperature and for a predetermined period;

in which, at the end of said cross-linking, said composition comprising at least one thermally degradable polymer has the following characteristics:
(a) a value of the dynamic elastic modulus (G'), measured at a temperature of 80° C., at a frequency of 1 Hz, with a deformation of 5%, which is at least 60% lower than the value of said modulus measured at a temperature of 80° C., at a frequency of 1 Hz, with a deformation of 1%;
(b) a value of the dynamic elastic modulus (G'), measured at a temperature of 80° C., at a frequency of 1 Hz, with a deformation of 5%, which is not less than 0.05 KPa, preferably in the range from 0.1 KPa to 0.4 KPa.

In a preferred embodiment, the step of cross-linking is carried out by heating the green tyre to a temperature in the range from 100° C. to 250° C., preferably from 120° C. to 200° C.

In a further preferred embodiment, said layer consisting of a composition comprising at least one thermally degradable polymer is obtained by winding at least one ribbon-like band consisting of said composition comprising at least one thermally degradable polymer in close coils along the cross-sectional profile of a toroidal support. Said ribbon-like band may be produced, for example, by extruding said composition comprising at least one thermally degradable polymer. Further details of the methods of forming and/or depositing the various components of the tyre on a toroidal support are described, for example, in patent applications EP 943,421, EP 919,406 and WO 01/36185 in the name of the present Applicant.

In a further aspect, the present invention relates to a sealing material having the following characteristics:
(a) a value of the dynamic elastic modulus (G'), measured at a temperature of 80° C., at a frequency of 1 Hz, with a deformation of 5%, which is at least 60% lower than the value of said modulus measured at a temperature of 80° C., at a frequency of 1 Hz, with a deformation of 1%;
(b) a value of the dynamic elastic modulus (G'), measured at a temperature of 80° C., at a frequency of 1 Hz, with a deformation of 5%, which is not less than 0.05 KPa, preferably in the range from 0.1 KPa to 0.4 KPa.

In a preferred embodiment, the thermally degradable polymer which can be used according to the present invention can be selected from homopolymers of at least one alpha-olefin having from 3 to 12 atoms of carbon or its derivatives; copolymers of at least one alpha-olefin having from 3 to 12 carbon atoms, with at least one olefin selected from: ethylene, conjugated or non-conjugated dienes having from 4 to 20 carbon atoms, or mixtures thereof.

Examples of alpha-olefins which can be used according to the present invention are: propylene, 1-butene, isobutene, 1-pentene, 1-hexene, 1-octene, or mixtures thereof.

Examples of diene monomers which can be used according to the present invention are: 1,3-butadiene, isoprene, 1,4-hexadiene, 1,4-cyclohexadiene, 5-ethylidene-2-norbornene, 5-methylene-2-norbornene, vinylnorbornene, or mixtures thereof.

Thermally degradable polymers which are particularly preferred are: polypropylene; butyl rubber; ethylene/propylene copolymers containing not more than 5% by weight of ethylene, preferably not more than 1% by weight; ethylene/propylene/diene terpolymers containing not more than 5% by weight of ethylene, preferably not more than 1% by weight, and not more than 5% by weight of diene, preferably not more than 1% by weight.

Even more preferably, the thermally degradable polymer is selected from butyl rubbers. Butyl rubbers are produced by copolymerization of isobutene with a small quantity of isoprene. Butyl rubbers generally contain from about 1% by weight to about 5% by weight of isoprene-derived repeated units and from about 95% by weight to about 99% by weight of isobutene-derived repeated units. Butyl rubbers which can be used advantageously according to the present invention have an average molecular weight in the range from 200,000 to 500,000, preferably from 300,000 to 400,000.

Examples of butyl rubbers which can be used in the present invention and are currently available on the market are the Bayer Butyl® products made by Bayer.

In a preferred embodiment, the reinforcing filler can be selected from carbon black, silica, alumina, aluminosilicates, calcium carbonate, kaolin, or mixtures thereof. Carbon black is preferred.

The types of carbon black which can be used according to the present invention can be selected from those conventionally used in the production of tyres which generally have a surface area of not less than 20 m$^2$/g (determined by absorption of CTAB as described in the ISO 6810 standard).

The silica which can be used according to the present invention can generally be a pyrogenic silica or, preferably, a precipitated silica, having a surface area BET (measured according to the ISO 5794/1 standard) in the range from 50 m$^2$/g to 500 m$^2$/g, preferably from 70 m$^2$/g to 200 m$^2$/g.

In a preferred embodiment, the plasticizer can be selected from: mineral oils, vegetable oils, synthetic oils, or mixtures thereof such as, for example, aromatic oil, naphthenic oil, phthalates, soya oil, or mixtures thereof. An aromatic oil is preferred.

In a preferred embodiment, the organic peroxide can be selected from organic peroxides having a high degradation temperature, preferably above 100° C. Specific examples of organic peroxides which can be used according to the invention are: 2,5-bis(t-butyl peroxy)-2,5-t-butylhexane, 1,1-di(t-butyl peroxy)-3,3,5-trimethyl cyclohexane, 2,5-dimethyl-2,5-di(t-butyl peroxy)hexine-3, p-chlorobenzyl peroxide, 2,4-dichlorobenzyl peroxide, 2,2-bis(t-butyl peroxy) butane, di-t-butyl peroxide, benzyl peroxide, 2,5-bis(t-butyl peroxy)-2,5-dimethylhexane, dicumyl peroxide, 2,5-dimethyl-2,5-di(t-butyl peroxy)hexane, or mixtures thereof. Dicumyl peroxide is preferred.

Said peroxides can be added to the polymeric material as such (100% active peroxide) or supported on inert fillers such as calcium carbonate, or can be dispersed in a silicone oil (from about 35% to about 60% of active peroxide).

Said thermally degradable composition can optionally comprise other additives commonly used in elastomeric compositions. For example, antioxidants, anti-ageing agents, adhesives, anti-ozone agents, modifying resins, or mixtures thereof can be added to said polymeric material.

The thermally degradable composition according to the present invention can be prepared by mixing the components indicated above with the other additives which may be present, according to methods known in the art. The mixing can be carried out, for example, by means of a mixer of the open-mill type, or an internal mixer of the type with tangential rotors (Banbury) or interlocking rotors (Intermix), or in continuous mixers of the Ko-Kneader (Buss) type or the twin-screw co-rotating or counter-rotating type.

BRIEF DESCRIPTION OF THE DRAWINGS

The present invention will now be illustrated further by some examples of embodiment, with reference to the attached FIG. 1 and FIG. 2, which show a sectional view of a portion of the tyre made according to the invention.

DETAILED DESCRIPTION OF THE EXEMPLARY EMBODIMENTS

Figure 1:
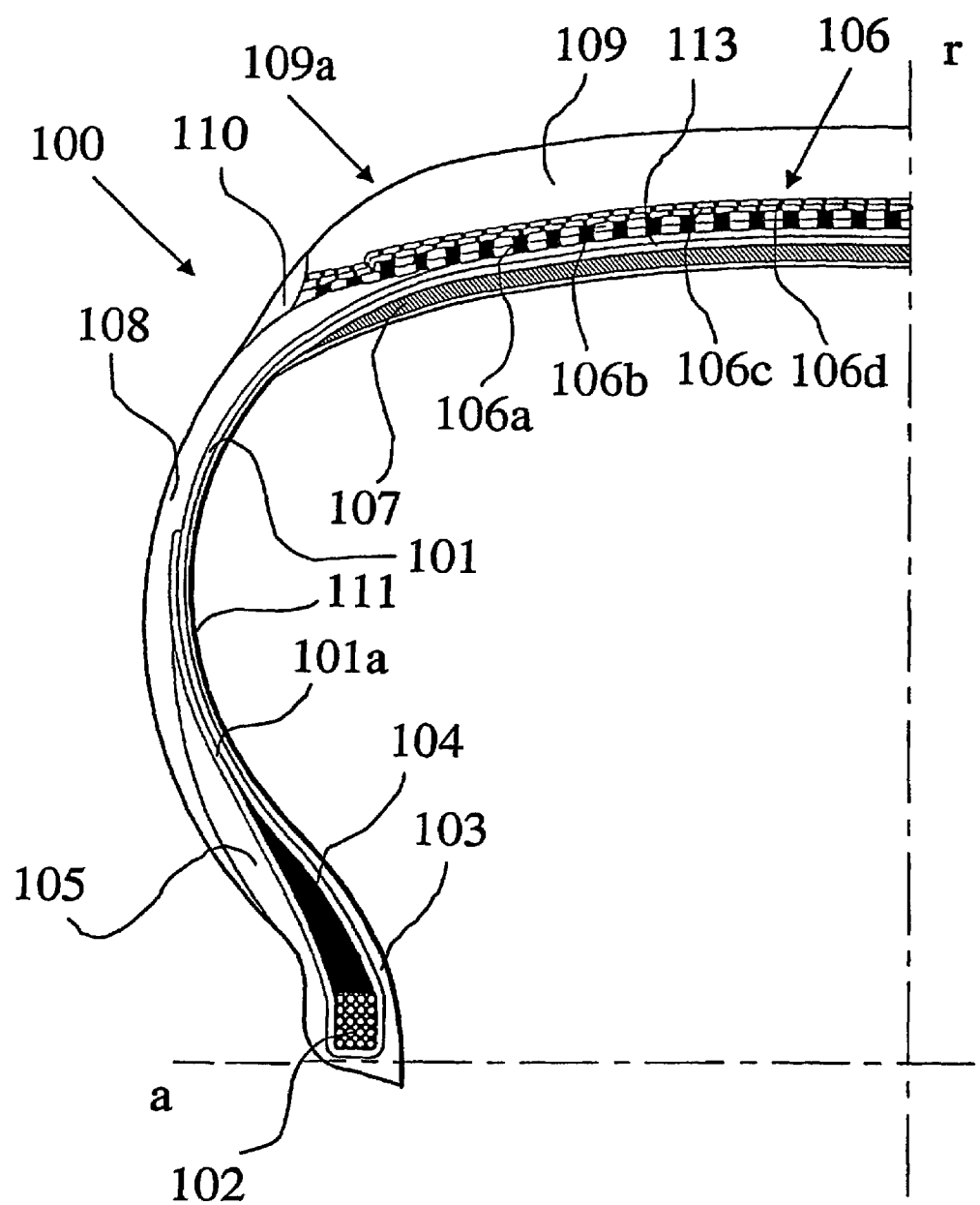
Figure 2:
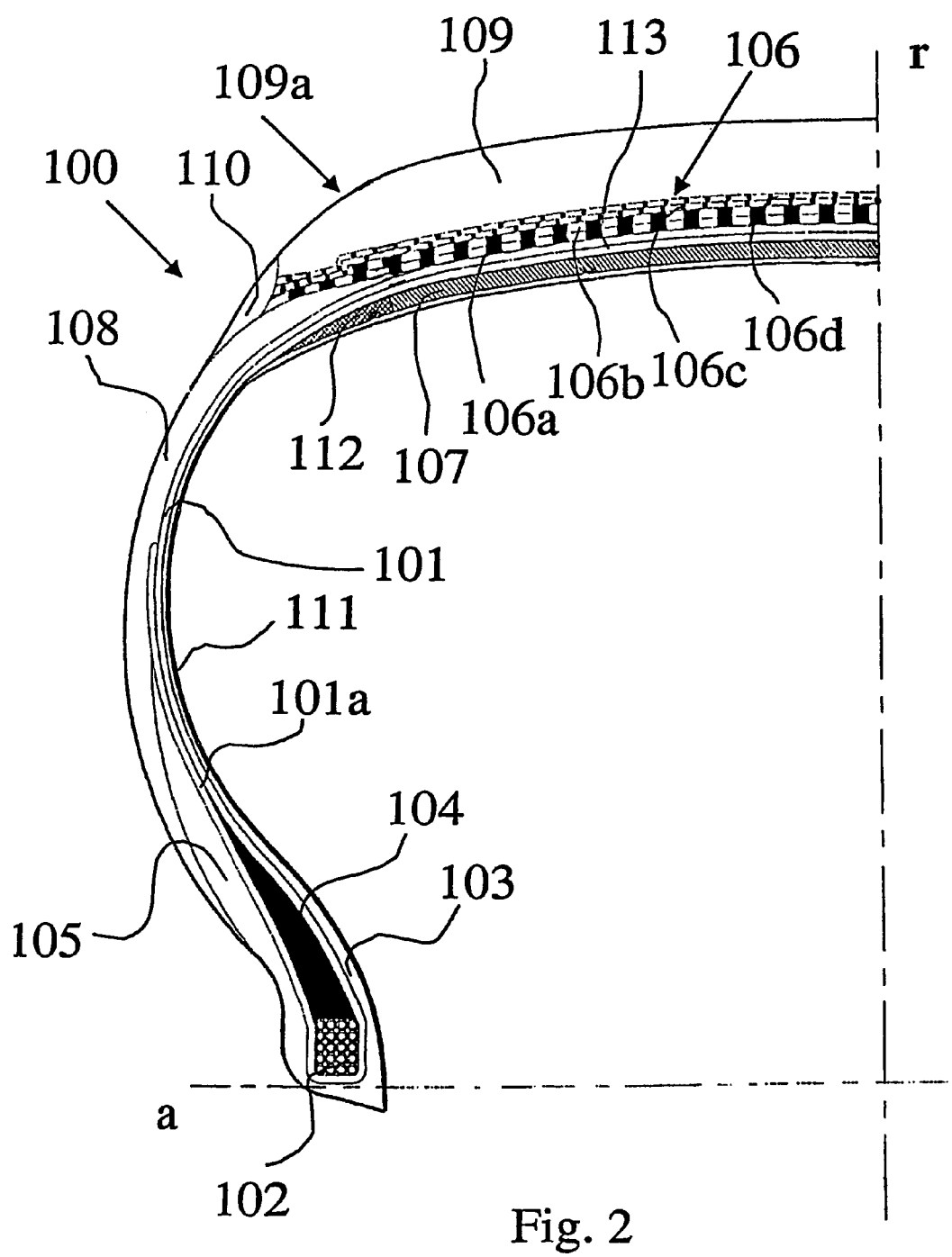

The letter "a" indicates an axial direction, and "r" indicates a radial direction. For simplicity, FIG. 1 and FIG. 2 show only a portion of the tyre, the remaining portion, which is not shown, is identical and symmetrically arranged with respect to the radial direction "r".

The tyre (100) comprises at least one carcass ply (101) whose opposite lateral edges are associated with respective bead wires (102). The association between the carcass ply (101) and the bead wires (102), in this case, is achieved by folding back the opposite lateral edges of the carcass ply (101) around the bead wires (102), so as to form the so-called carcass back-folds (101a) as shown in FIG. 1 and FIG. 2.

Alternatively, the conventional bead wires (102) can be replaced by a pair of circumferentially inextensible annular inserts formed by elongate elements arranged in concentric coils (not shown in FIG. 1 and FIG. 2) (see, for example, European patent applications EP 928,680 and EP 928,702). In this case, the carcass ply (101) is not back-folded around said annular inserts, the coupling being provided by a second carcass ply (not shown in FIG. 1 and FIG. 2) applied externally onto the first ply.

The carcass ply (101) generally consists of a plurality of reinforcing cords arranged parallel to each other and at least partially covered with a layer of elastomeric mixture. These reinforcing cords usually consist of textile fibres such as, for example, rayon, nylon, polyethylene terephthalate, or of steel wires which are stranded together, covered with a metal alloy (for example copper/zinc, zinc/manganese, zinc/molybdenum/cobalt alloys and the like).

The carcass ply (101) is usually of the radial type; in other words, it incorporates reinforcing cords arranged in a substantially perpendicular direction with respect to a circumferential direction. Each bead wire (102) is encased in a bead (103), defined along an inner circumferential edge of the tyre (100), with which the tyre engages on a rim (not shown in FIG. 1 and FIG. 2) forming part of a vehicle wheel. The space defined by each carcass back-fold (101a) contains a bead filler (104) in which the bead wires (102) are embedded. An anti-abrasion strip (105) is usually placed in an axially outer position with respect to the carcass back-fold (101a).

A belt structure (106) is applied along the circumferential development of the carcass ply (101). In the particular embodiment shown in FIG. 1 and FIG. 2, the belt structure (106) comprises two belt strips (106a, 106b) which incorporate a plurality of reinforcing cords, typically metal cords, which are parallel to each other in each strip and intersecting with respect to the adjacent strip, orientated so as to form a predetermined angle with respect to a circumferential direction. At least one reinforcing layer (106c) can be optionally applied to the radially outermost belt strip (106b). In the particular embodiment shown in FIG. 1 and FIG. 2, two zero-degrees reinforcing layers (106c, 106d) are applied, these being commonly known as "0° belt", generally incorporating a plurality of reinforcing cords, typically textile cords, arranged at an angle of a few degrees with respect to a circumferential direction, and covered and welded together by means of an elastomeric material.

A sidewall (108), which extends, in an axially outer position, from the bead (103) to the end of the belt structure (106), is also applied externally to the carcass ply (101).

A tread (109), whose lateral edges are connected to the sidewalls (108), is applied circumferentially in a radially outer position with respect to the belt structure (106). Externally, the tread (109) has a rolling surface (109a) designed to come into contact with the ground. In this surface (109a), shown for simplicity as smooth in FIG. 1 and FIG. 2, there are generally made circumferential grooves which are connected by transverse notches (not shown in FIG. 1 and FIG. 2) so as to define a plurality of blocks of various shapes and sizes distributed over the rolling surface (109a).

In the connecting zone between the sidewalls (108) and the tread (109) there may optionally be present a strip of elastomeric material (110) commonly known as a "mini-sidewall", which is generally obtained by co-extrusion with the tread and enables the mechanical interaction between the tread (109) and the sidewalls (108) to be improved. Alternatively, the end portion of the sidewall (108) is made to directly cover the lateral edge of the tread (109). Between the belt structure (106) and the tread (109) there may optionally be present a underlayer which forms, together with the tread (109), a structure commonly known as a "cap and base" (not shown in FIG. 1 and FIG. 2).

In the case of tubeless tyres, a layer of elastomeric material (111), generally called a "liner", can also be provided in a radially inner position with respect to the carcass ply (101), to provide the necessary impermeability to the inflation air of the tyre. A layer of sealing material (107) which can be made according to the present invention can be placed between the layer of elastomeric material (111) and the carcass ply (101). A further layer of elastomeric material (113), generally called a "under-liner", can also be provided above the layer of elastomeric material (111), as an additional means of ensuring the impermeability of the tyre to an inflating fluid when the tyre is fitted on a rim and inflated. Two strips of elastomeric material with an essentially triangular cross section (112) can optionally be placed along each outer edge of the layer of sealing material (107), as shown in FIG. 2. Said strips have the function of containing the sealing material in a specified area, thus preventing, for example, infiltrations of the material between the adjacent elements, particularly during the vulcanization of the tyre. Said infiltrations could cause problems of co-vulcanization and detachment of said elements, which would tend to detract from the performance and durability of the finished tyre.

The process for producing the tyre according to the present invention can be carried out according to technique and using apparatus that are known in the prior art, as described, for example, in the patents EP 199,064, U.S. Pat. Nos. 4,872,822 and 4,768,937, said process including at least one step of manufacturing the green tyre and at least one step of vulcanizing it.

More particularly, the process for producing the tyre comprises the steps of preparing beforehand and separately from each other a series of semi-finished articles corresponding to the different parts of the tyre (carcass plies, belt structure, bead wires, fillers, sidewalls and tread) which are subsequently associated with each other by means of suitable manufacturing machine generally comprising at least one building drum. Next, the subsequent step of vulcanization welds the aforesaid semi-finished articles together to produce a monolithic block, i.e. the finished tyre.

Naturally, the step of preparing the aforesaid semi-finished articles is preceded by a step of preparing and moulding the corresponding mixtures which are the constituents of said semi-finished articles, according to conventional techniques.

The green tyre produced in this way is then sent for the subsequent steps of moulding and vulcanization. To this end, a vulcanization mould is used which is designed to receive the tyre being processed inside a moulding cavity having walls which are countermoulded and which define the outer surface of the tyre when the vulcanization is complete.

Alternative processes for the production of a tyre or of parts thereof without making use of semi-finished articles are described, for example, in the patent applications EP 928,680 and EP 928,702 cited above.

The moulding of the green tyre can be carried out by introducing a pressurized fluid into the space delimited by the inner surface of the tyre, so as to press the outer surface of the green tyre against the walls of the moulding cavity. In one of the most widespread moulding methods, a vulcanization chamber of elastomeric material filled with steam and/or another pressurized fluid is inflated inside the tyre which is enclosed in the moulding cavity. In this way, the green tyre is pushed against the inner walls of the moulding cavity, thus obtaining the desired moulding. Alternatively, the moulding can be carried out without an inflatable vulcanization chamber, by providing inside the tyre a metallic toroidal support shaped according to the configuration of the inner surface of the tyre to be produced, as described, for example, in the patent EP 242,840. The difference in the coefficient of thermal expansion between the metallic toroidal support and the green elastomeric material is exploited to provide an appropriate moulding pressure.

At this point, the step of vulcanizing the green elastomeric material present in the tyre is carried out. For this purpose, the outer wall of the vulcanization mould is brought into contact with a heating fluid (generally steam) in such a way that the outer wall reaches a maximum temperature generally in the range from 100° C. to 230° C. At the same time, the inner surface of the tyre is brought to the vulcanization temperature by using the pressurized fluid which is also used to press the tyre against the walls of the moulding cavity, heated to a maximum temperature in the range from 100° C. to 250° C. The time required to obtain a satisfactory degree of vulcanization throughout the mass of the elastomeric material can generally vary from 3 to 90 minutes, and is mainly dependent on the dimensions of the tyre. When the vulcanization is complete, the tyre is removed from the vulcanization mould.

The present invention is further illustrated below by some examples of embodiment provided for guidance only and without restrictive intent.

EXAMPLES 1 AND 2

The compositions shown in Table 1 (the quantities of the various components have been expressed in phr) were prepared as follows.

All the components shown in Table 1 were loaded into a laboratory internal mixer of the type with tangential rotor (Banbury), model PL 1.6 made by Pomini, which was rotated at approximately 40 r.p.m. After approximately three minutes, but in any case as soon as the temperature reached 120° C., said compositions were discharged from the mixer and then transferred to a laboratory open cylinder mixer.

TABLE 1

| EXAMPLE | 1 | 2 (*) |
|---|---|---|
| IIR | 100 | 100 |
| Polyisobutylene | — | 5 |
| Carbon black | 60 | 40 |
| Aromatic oil | 40 | 35 |
| Peroxide | 10 | 8 |

(*) = control.

IIR: Isobutylene/isoprene copolymer having a degree of unsaturation of 1.75%±0.20 molar (Bayer Butyl® 301, a commercial product made by Bayer);
Polyisobutylene: Vistanex® LM-MS-LC, a commercial product made by Exxon Mobil;
Carbon black: N660 (Cabot);
Peroxide:. Dicumyl peroxide (100% active peroxide; Perkadox BC-FF, a commercial product made by Akzo Nobel).

The compositions prepared in this way were subject to MDR rheometric analysis, using a Monsanto R.P.A. 2000 rheometer. For this purpose, cylindrical test specimens with weights in the range from 4.5 g to 5.5 g were obtained by punching from said non-degraded compositions, and were subjected to the following cycle:
1°: measurement of (G') at 80° C., frequency 1 Hz, deformation 1% and 5%;
2°: heating of the test specimen to 200° C. for 10 minutes;
3°: measurement of (G') at 80° C., frequency 1 Hz, deformation 1% and 5%.

The results are shown in Table 2.

TABLE 2

| EXAMPLE | 1 | 2 (*) |
|---|---|---|
| 1°: (G') at (1%) (KPa) | 99.50 | 89.13 |
| 3°: (G') at (1%) (KPa) | 0.765 | 0.383 |
| 1°: (G') at (5%) (KPa) | 56.384 | 56.920 |
| 3°: (G') at (5%) (KPa) | 0.153 | 0.230 |

(*): control.

EXAMPLE 3

The compositions of Examples 1 and 2 were used to prepare the layer of sealing material for Pirelli P6000® 195/60R15 tyres. The tyres made in this way were punctured with a 4 mm nail at four points located at 90° to each other around the tyre. After extraction of the nail, no air flowed out of either tyre. The tyres were then left in storage for 15 days; at the end of this period, it was found that the tyre having the layer of sealing material produced from the composition of Example 1 (according to the invention) was still substantially inflated, while the tyre having the layer of sealing material produced from the composition of Example 2 (control) was deflated. An analysis of the two tyres revealed that the layer of sealing material produced from the composition of Example 2 (control) had not remained in position. In particular, it was found that said sealing material had accumulated on the bottom of the tyre, thus causing the outflow of air from the upper holes.

The invention claimed is:
1. A tyre for a vehicle wheel, comprising:
a carcass structure comprising at least one carcass ply;
a belt structure disposed in a circumferentially outer position with respect to the carcass structure;
a tread circumferentially superimposed on the belt structure;
a pair of sidewalls disposed laterally on opposite sides with respect to the carcass structure; and
at least one layer of sealing material obtained by thermal degradation of a composition comprising at least one thermally degradable polymer, said composition comprising:
100 phr of at least one thermally degradable polymer;
greater than or equal to 50 phr and less than or equal to 150 phr of at least one reinforcing filler;
greater than or equal to 30 phr and less than or equal to 100 phr of at least one plasticizer; and
greater than or equal to 10 phr of at least one organic peroxide;
wherein the at least one carcass ply is shaped in a substantially toroidal configuration,
wherein opposite lateral edges of the at least one carcass ply are associated with respective bead wires,
wherein each bead wire is enclosed in a respective bead,
wherein the belt structure comprises at least one belt strip, wherein the at least one layer of sealing material is disposed in a radially inner position with respect to the at least one carcass ply, and wherein the sealing material comprises the following characteristics:

a value of a dynamic elastic modulus, measured at a temperature of 80° C., at a frequency of 1 Hz, and with a deformation of 5%, that is at least 60% lower than the value of the dynamic elastic modulus measured at the temperature of 80° C., at the frequency of 1 Hz, and with a deformation of 1%; and the value of the dynamic elastic modulus, measured at the temperature of 80° C., at the frequency of 1 Hz, and with the deformation of 5%, that is greater than or equal to 0.05 kPa.

2. The tyre of claim 1, wherein the sealing material comprises the following characteristics:

the value of the dynamic elastic modulus, measured at the temperature of 80° C., at the frequency of 1 Hz, and with the deformation of 5%, that is at least 60% lower than the value of the dynamic elastic modulus measured at the temperature of 80° C., at the frequency of 1 Hz, and with the deformation of 1%; and the value of the dynamic elastic modulus, measured at the temperature of 80° C., at the frequency of 1 Hz, and with the deformation of 5%, that is greater than or equal to 0.1 kPa and less than or equal to 0.4 kPa.

3. The tyre of claim 1, wherein the at least one layer of sealing material is disposed between:

the at least one carcass ply; and a first layer of elastomeric material disposed in a radially inner position with respect to the at least one carcass ply.

4. The tyre of claim 3, wherein a second layer of elastomeric material is disposed between the at least one layer of sealing material and the at least one carcass ply.

5. The tyre of claim 1, wherein the at least one layer of sealing material extends over a surface substantially corresponding to a surface of development of the tread.

6. The tyre of claim 1, wherein a strip of elastomeric material is placed along each axially outer edge of the at least one layer of sealing material.

7. The tyre of claim 1, wherein the at least one layer of sealing material comprises a thickness greater than or equal to 1.5 mm and less than or equal to 4.5 mm.

8. The tyre of claim 1, wherein the at least one thermally degradable polymer is selected from:

homopolymers of at least one alpha-olefin comprising greater than or equal to 3 and less than or equal to 12 carbon atoms or its derivatives; and copolymers of at least one alpha-olefin comprising greater than or equal to 3 and less than or equal to 12 carbon atoms, with at least one olefin comprising one or more of ethylene, conjugated dienes comprising greater than or equal to 4 and less than or equal to 20 carbon atoms, and non-conjugated dienes comprising greater than or equal to 4 and less than or equal to 20 carbon atoms.

9. The tyre of claim 1, wherein the at least one thermally degradable polymer is selected from: polypropylene; butyl rubber; ethylene/propylene copolymers containing not more than 5% by weight of ethylene; and ethylene/propylene/diene terpolymers containing not more than 5% by weight of ethylene and not more than 5% by weight of diene.

10. The tyre of claim 1, wherein the at least one thermally degradable polymer comprises one or more butyl rubbers.

11. The tyre of claim 1, wherein the at least one reinforcing filler comprises one or more of carbon black, silica, alumina, aluminosilicates, calcium carbonate, and kaolin.

12. The tyre of claim 1, wherein the at least one reinforcing filler comprises carbon black.

13. The tyre of claim 1, wherein the at least one plasticizer comprises:

one or more mineral oils;

one or more vegetable oils;

one or more synthetic oils;

a mixture of one or more mineral oils and one or more vegetable oils;

a mixture of one or more mineral oils and one or more synthetic oils;

a mixture of one or more vegetable oils and one or more synthetic oils; or a mixture of one or more mineral oils, one or more vegetable oils, and one or more synthetic oils.

14. The tyre of claim 1, wherein the at least one plasticizer comprises aromatic oil.

15. The tyre of claim 1, wherein the at least one organic peroxide comprises one or more organic peroxides comprising a degradation temperature greater than 100° C.

16. The tyre of claim 1, wherein the at least one organic peroxide comprises dicumyl peroxide.

17. A process for producing a tyre for a vehicle wheel, comprising:

making at least one coating layer of cross-linkable elastomeric material on an outer surface of a toroidal support whose shape is essentially complementary to an inner surface of the tyre;

making at least one layer consisting of a composition in a circumferentially outer position with respect to the at least one coating, wherein said composition comprises:

100 phr of at least one thermally degradable polymer;

greater than or equal to 50 phr and less than or equal to 150 phr of at least one reinforcing filler;

greater than or equal to 30 phr and less than or equal to 100 phr of at least one plasticizer; and greater than or equal to 10 phr of at least one organic peroxide: said at least one layer being;

disposing a carcass structure comprising at least one carcass ply in a circumferentially outer position with respect to the at least one layer consisting of said composition comprising at least one thermally degradable polymer;

disposing a belt structure in a circumferentially outer position with respect to the carcass structure;

disposing a tread in a circumferentially outer position with respect to the belt structure;

disposing at least one pair of sidewalls on the carcass structure in laterally opposite positions;

subjecting the at least one coating layer, the at least one layer consisting of said composition comprising at least one thermally degradable polymer, the carcass structure, the belt structure, the tread, and the at least one pair of sidewalls to moulding in a cavity formed in a vulcanization mould; and subjecting the at least one coating layer, the at least one layer consisting of said composition comprising at least one thermally degradable polymer, the carcass structure, the belt structure, the tread, and the at least one pair of sidewalls to cross-linking by heating to a predetermined temperature and for a predetermined period of time;

wherein, at an end of the cross-linking, said composition comprising at least one thermally degradable polymer comprises the following characteristics:
a value of a dynamic elastic modulus, measured at a temperature of 80° C., at a frequency of 1 Hz, and with a deformation of 5%, that is at least 60% lower than the value of the dynamic elastic modulus measured at the temperature of 80° C., at the frequency of 1 Hz, and with a deformation of 1%; and
the value of the dynamic elastic modulus, measured at the temperature of 80° C., at the frequency of 1 Hz, and with the deformation of 5%, that is greater than or equal to 0.05 kPa.

18. The process of claim 17, wherein, at the end of the cross-linking, said composition comprising at least one thermally degradable polymer comprises the following characteristics:
the value of the dynamic elastic modulus, measured at the temperature of 80° C., at the frequency of 1 Hz, and with the deformation of 5%, that is at least 60% lower than the value of the dynamic elastic modulus measured at the temperature of 80° C., at the frequency of 1 Hz, and with the deformation of 1%; and
the value of the dynamic elastic modulus, measured at the temperature of 80° C., at the frequency of 1 Hz, and with the deformation of 5%, that is greater than or equal to 0.1 kPa and less than or equal to 0.4 kPa.

19. The process of claim 17, wherein the cross-linking is carried out by heating the at least one coating layer, the at least one layer consisting of said composition comprising at least one thermally degradable polymer, the carcass structure, the belt structure, the tread, and the at least one pair of sidewalls to a temperature greater than or equal to 100° C. and less than or equal to 250° C.

20. The process of claim 17, wherein the at least one layer consisting of said composition comprising at least one thermally degradable polymer is obtained by winding at least one ribbon band consisting of said composition comprising at least one thermally degradable polymer in close coils along a cross-sectional profile of the toroidal support.

21. The process of claim 17, wherein the at least one thermally degradable polymer is selected from:
homopolymers of at least one alpha-olefin comprising greater than or equal to 3 and less than or equal to 12 carbon atoms or its derivatives; and
copolymers of at least one alpha-olefin comprising greater than or equal to 3 and less than or equal to 12 carbon atoms, with at least one olefin comprising one or more of ethylene, conjugated dienes comprising greater than or equal to 4 and less than or equal to 20 carbon atoms, and non-conjugated dienes comprising greater than or equal to 4 and less than or equal to 20 carbon atoms.

22. The process of claim 17, wherein the at least one thermally degradable polymer is selected from: polypropylene; butyl rubber; ethylene/propylene copolymers containing not more than 5% by weight of ethylene; and ethylene/propylene/diene terpolymers containing not more than 5% by weight of ethylene and not more than 5% by weight of diene.

23. The process of claim 17, wherein the at least one thermally degradable polymer comprises one or more butyl rubbers.

24. The process of claim 17, wherein the at least one reinforcing filler comprises one or more of carbon black, silica, alumina, aluminosilicates, calcium carbonate, and kaolin.

25. The process of claim 17, wherein the at least one reinforcing filler comprises carbon black.

26. The process of claim 17, wherein the at least one plasticizer comprises:
one or more mineral oils;
one or more vegetable oils;
one or more synthetic oils;
a mixture of one or more mineral oils and one or more vegetable oils;
a mixture of one or more mineral oils and one or more synthetic oils;
a mixture of one or more vegetable oils and one or more synthetic oils; or
a mixture of one or more mineral oils, one or more vegetable oils, and one or more synthetic oils.

27. The process of claim 17, wherein the at least one plasticizer comprises aromatic oil.

28. The process of claim 17, wherein the at least one organic peroxide comprises one or more organic peroxides comprising a degradation temperature greater than 100° C.

29. The process of claim 17, wherein the at least one organic peroxide comprises dicumyl peroxide.

30. A sealing material comprising:
100 phr of at least one thermally degradable polymer;
greater than or equal to 50 phr and less than or equal to 150 phr of at least one reinforcing filler;
greater than or equal to 30 phr and less than or equal to 100 phr of at least one plasticizer; and
greater than or equal to 10 phr of at least one organic peroxide;
wherein said sealing material comprises the following characteristics:
a value of a dynamic elastic modulus, measured at a temperature of 80° C., at a frequency of 1 Hz, and with a deformation of 5%, that is at least 60% lower than a value of the dynamic elastic modulus measured at the temperature of 80° C., at the frequency of 1 Hz, and with a deformation of 1%; and
the value of the dynamic elastic modulus, measured at the temperature of 80° C., at the frequency of 1 Hz, and with the deformation of 5%, that is greater than or equal to 0.05 kPa.

31. The material of claim 30, comprising the following characteristics:
the value of the dynamic elastic modulus, measured at the temperature of 80° C., at the frequency of 1 Hz, and with the deformation of 5%, that is at least 60% lower than the value of the dynamic elastic modulus measured at the temperature of 80° C., at the frequency of 1 Hz, and with the deformation of 1%; and
the value of the dynamic elastic modulus, measured at the temperature of 80° C., at the frequency of 1 Hz, and with the deformation of 5%, that is greater than or equal to 0.1 kPa and less than or equal to 0.4 kPa.

* * * * *

UNITED STATES PATENT AND TRADEMARK OFFICE
CERTIFICATE OF CORRECTION

PATENT NO.       : 7,322,393 B2                                             Page 1 of 1
APPLICATION NO.  : 10/490872
DATED            : January 29, 2008
INVENTOR(S)      : Serra et al.

It is certified that error appears in the above-identified patent and that said Letters Patent is hereby corrected as shown below:

Claim 17, column 12, line 42, "peroxide:" should read --peroxide;--.

Claim 17, column 12, line 42, delete "said at least one layer being;"

Signed and Sealed this

Nineteenth Day of August, 2008

JON W. DUDAS
*Director of the United States Patent and Trademark Office*